(12) United States Patent
Heiden

(10) Patent No.: US 8,390,927 B2
(45) Date of Patent: Mar. 5, 2013

(54) ELEMENT FOR HOMOGENIZING THE ILLUMINATION WITH SIMULTANEOUS SETTING OF THE POLARIZATION DEGREE

(75) Inventor: Michael Heiden, Woelfersheim (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 618 days.

(21) Appl. No.: 12/154,728

(22) Filed: May 27, 2008

(65) Prior Publication Data
US 2008/0304152 A1 Dec. 11, 2008

(30) Foreign Application Priority Data
May 30, 2007 (DE) .......................... 10 2007 028 195

(51) Int. Cl.
*G02B 27/28* (2006.01)
(52) U.S. Cl. .......... 359/486.01; 359/488.01; 359/490.01
(58) Field of Classification Search .................. 359/385, 359/386, 389, 489, 493, 501
See application file for complete search history.

(56) References Cited

U.S. PATENT DOCUMENTS

| 5,839,807 A | 11/1998 | Perlo | |
|---|---|---|---|
| 7,301,697 B2* | 11/2007 | Kohno | 359/386 |
| 7,307,785 B2* | 12/2007 | Obrebski et al. | 359/389 |
| 2005/0088740 A1* | 4/2005 | Takeda et al. | 359/489 |
| 2006/0012872 A1* | 1/2006 | Hayashi et al. | 359/386 |
| 2006/0012873 A1* | 1/2006 | Totzeck et al. | 359/386 |
| 2007/0206276 A1* | 9/2007 | Gugel et al. | 359/385 |
| 2007/0206278 A1* | 9/2007 | Dyba et al. | 359/385 |
| 2009/0046360 A1* | 2/2009 | Funk et al. | 359/385 |
| 2009/0135432 A1* | 5/2009 | Betzig | 356/521 |

FOREIGN PATENT DOCUMENTS

DE 69600617 1/1999

* cited by examiner

*Primary Examiner* — Frank Font
(74) *Attorney, Agent, or Firm* — Simpson & Simpson, PLLC

(57) ABSTRACT

Element for homogenizing the illumination with simultaneous setting of the polarization degree, wherein the element consists of at least two components. The first component is a microlens array, and the second component is a filter for setting the desired polarization.

4 Claims, 4 Drawing Sheets

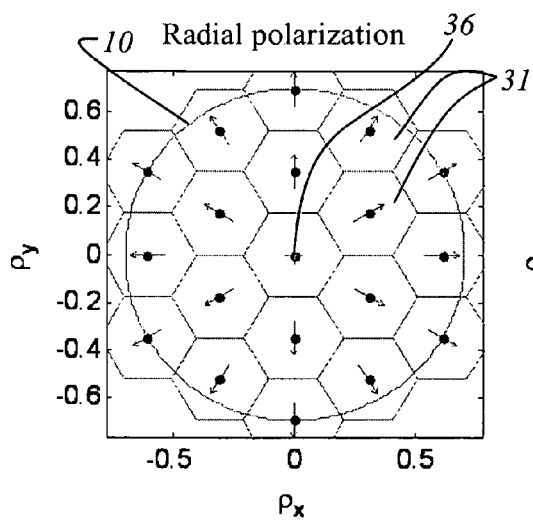
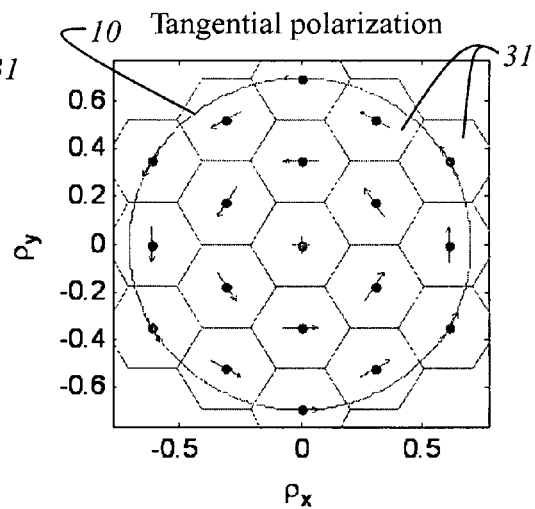
Fig. 5a
Fig. 6a
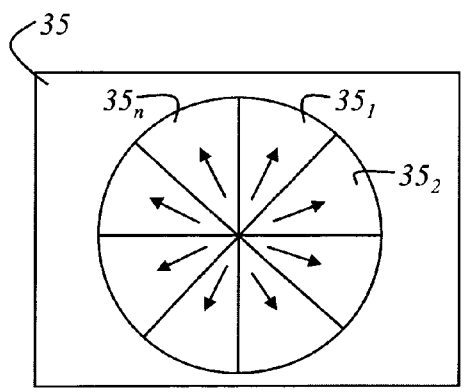
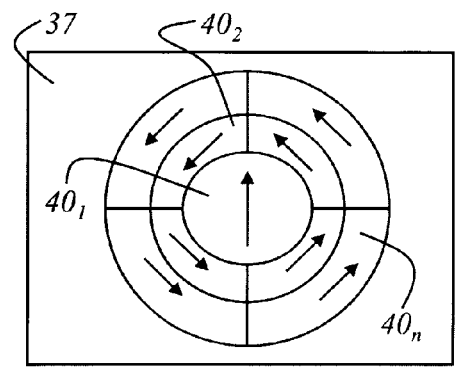
Fig. 5b
Fig. 6b

US 8,390,927 B2

ELEMENT FOR HOMOGENIZING THE ILLUMINATION WITH SIMULTANEOUS SETTING OF THE POLARIZATION DEGREE

CROSS REFERENCE TO RELATED APPLICATIONS

This patent application claims priority of German Patent Application No. 10 2007 028 195.3, filed on May 30, 2007, the application is incorporated herein by reference.

FIELD OF THE INVENTION

The invention relates to an element for homogenizing the illumination with simultaneous setting of the polarization degree. The element consists of at least two components.

SUMMARY OF THE INVENTION

It is the object of the present invention to provide an element for homogenizing the illumination with which a structured illumination of a pupil of an objective may be achieved in a simple way.

This object is achieved by an element for homogenizing the illumination with simultaneous setting of the polarization degree. The element has at least two components, wherein the first component includes a microlens array, and the second component includes a filter for setting the desired polarization.

It is particularly advantageous if the element for homogenizing the illumination with simultaneous setting of the polarization degree consists of at least two components. The first component includes a microlens array. The second component consists of a filter used for setting the desired polarization.

The filter may have a linear polarization in the X-coordinate direction. It is also contemplated that the filter has a linear polarization in the Y-coordinate direction.

The orientation of the linear polarization will generally depend on the orientation of the structures on the substrate. If the structures have a preferred direction in the X-coordinate direction or in the Y-coordinate direction, the polarization will be oriented accordingly. This will generally not be the case for diagonal structures.

The filter may be designed such that the result is a circular polarization.

The filter and the microlens array may be arranged in a common holder. At least the filter is designed to be replaceable. The filter may also be arranged fixedly in the optical path.

In a further embodiment, a filter may be associated with each lens element of the microlens array. In that case, each filter is fixedly connected to the microlens array.

The element is mainly used for illuminating a pupil of an object of an optical system, wherein light with defined polarization is radiated onto the pupil of the objective. At the same time, the object field of the objective may be homogenized.

BRIEF DESCRIPTION OF THE DRAWINGS

In the following, embodiments of the invention and their advantages will be explained based on the accompanying figures, in which:

FIG. 5a shows a further embodiment of the illumination pupil, wherein the filter is designed such that, all in all, there is a radial polarization of the illumination pupil;

FIG. 5b shows a schematic representation of the filter for generating a radial polarization of the illumination pupil;

FIG. 6a shows a further embodiment of the illumination pupil, wherein a tangential polarization of the whole illumination pupil is achieved with the help of the filter;

FIG. 6b shows a schematic representation of the filter for generating a tangential polarization of the illumination pupil;

DETAILED DESCRIPTION OF THE PREFERRED EMBODIMENTS

Figures 1, 2:
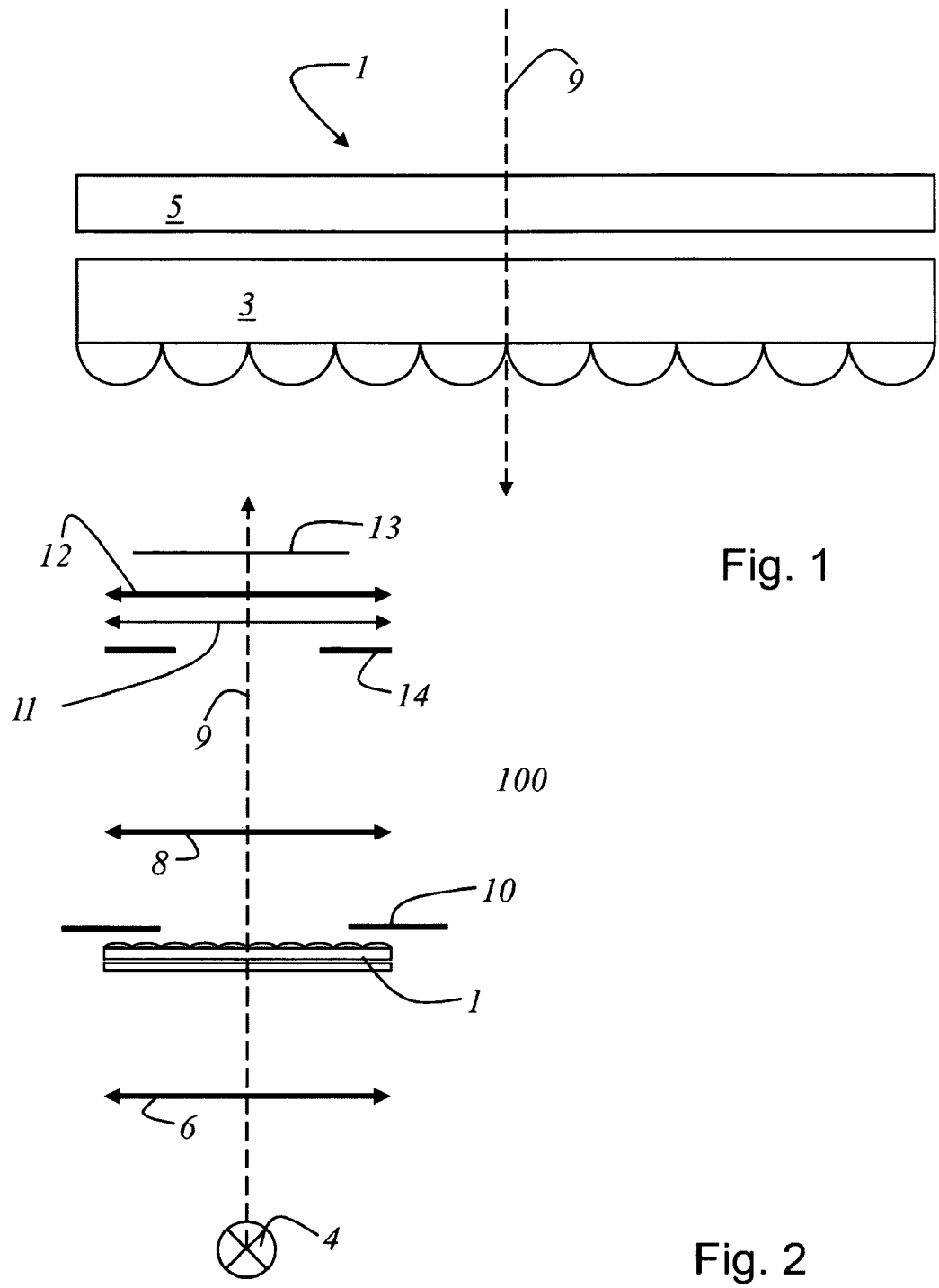
FIG. 1 shows a schematic representation of the element consisting of a microlens array and a filter.
FIG. 2 shows a schematic representation of the use of the element for illuminating a pupil of an objective.

FIG. 1 shows a schematic representation of an element 1 for a defined adjustment of the polarization of the illumination light. Element 1 consists of at least a first element 3 and a second element 5. First element 3 is a microlens array, and second element 5 represents a filter with which a predetermined polarization may be achieved. First element 3 and second element 5 are aligned along an optical axis 9.

FIG. 2 shows a schematic arrangement of the use of element 1 in an optical system 100. The elements of optical system 100 are aligned along optical axis 9. From a light source 4, a light beam reaches a condenser 6 directing the light to element 1. Element 1 is positioned in front of an illumination pupil 10. The light coming from element 1 is directed to an intermediate image plane 14 by imaging optics 8. It is known how to design the microlens array of element 1 and imaging optics 8 to achieve a homogeneous illumination. Together with further optics 11, imaging optics 8 images illumination pupil 10 into the pupil of an objective 12. Furthermore, intermediate image plane 14 is imaged into an objective plane 13 of objective 12 by optics 11 and objective 12. Since intermediate image plane 14 is illuminated homogeneously, objective plane 13 is also illuminated homogeneously if optics 11 and objective 12 are suitably designed. The degree of polarization in the pupil of objective 12 is then identical to that of illumination pupil 10.

Figure 3A:
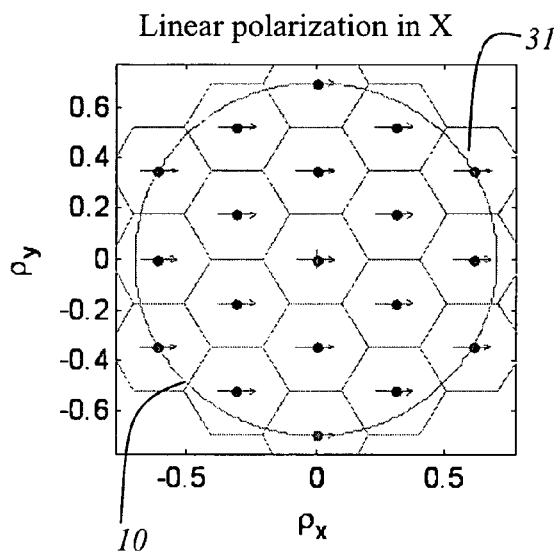
FIG. 3a shows a schematic representation of an example of a linearly polarized illumination pupil, each segment being polarized in the X-direction.
Figure 3B:
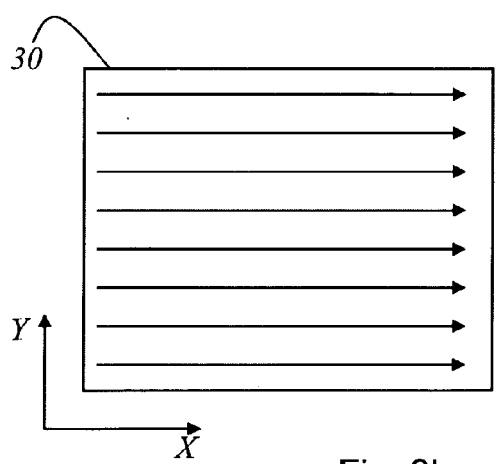
FIG. 3b shows a schematic representation of the filter linearly polarized in the X-coordinate direction.

FIG. 3a shows the resulting illumination of the pupil of objective 12 when using a polarization filter 30 having a linear polarization in the X-coordinate direction (see also FIG. 3b). Microlens array 3 thus allows imaging individual segments 31 exhibiting a linear polarization in the image in illumination pupil 10. Taking the aperture of the pupil of objective 12 as a whole, the result is thus a linear polarization.

Figure 4A:
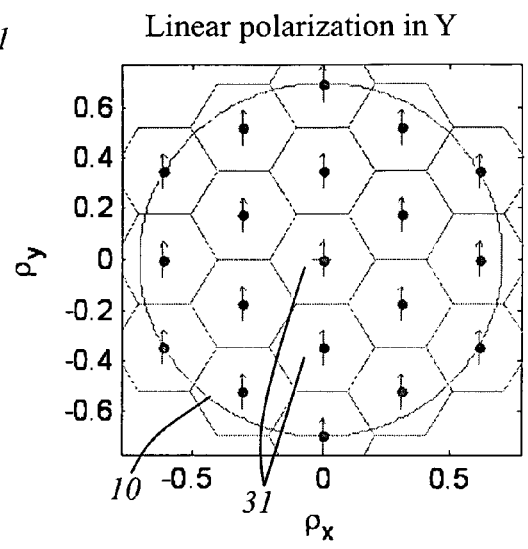
FIG. 4a shows a further embodiment of the illumination pupil illuminated by linearly polarized light, wherein each segment is polarized in the Y-direction.
Figure 4B:
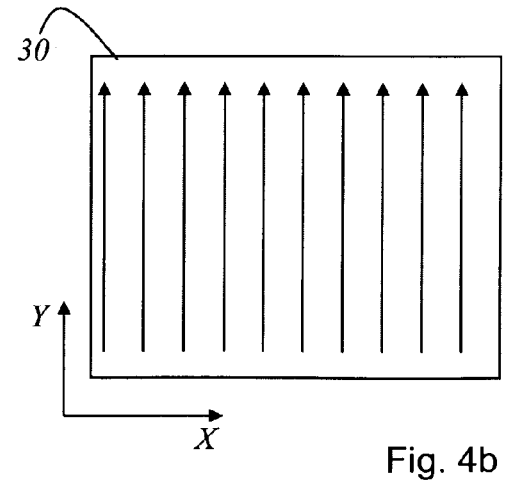
FIG. 4b shows a schematic representation of the filter linearly polarized in the Y-direction.

FIG. 4a schematically shows the imaging of microlens array 3 in the pupil of objective 12. A filter according to FIG. 4b is used, which has a linear polarization in the Y-direction. When imaging element 1 into the pupil of objective 12, the result is the pattern shown in FIG. 4a, wherein each segment 31 has an individual polarization in the Y-direction. Averaging across the whole aperture of the pupil of objective 12, the result is thus a linear polarization in the Y-direction.

FIG. 5a shows a further embodiment, wherein the imaging of microlens array 1 into the pupil of objective 12 results in a radial polarization. The radial polarization is achieved by means of a filter 35 as shown in FIG. 5b. Filter 35 is divided into individual segments $35_1$, $35_2$ to $35_n$. The polarization of the individual segments is directed radially outwards from a center 36 of the filter. If the microlens array is illuminated via filter 35, the result is individual segments 31 having an individual polarization in the pupil of objective 12, wherein the polarization averaged across all elements yields a radial polarization.

FIG. 6a shows a further embodiment of setting the polarization of an objective pupil 10 of an objective 12. The pupil of objective 12 is illuminated by means of a filter 37 as shown in FIG. 6b. The filter includes several concentrically arranged circles $40_1$, $40_2$ to $40_n$. Circles $40_2$ to $40_n$ following circle $40_1$ are again divided into segments. Each segment has a polarization direction running tangentially. The illumination of the objective pupil by means of filter 37 shown in FIG. 6b results in a polarization of the individual segments, wherein the polarization is oriented tangentially with respect to a center 40 of the objective. Averaging across all segments 31 yields a tangential polarization in the pupil of objective 12.

Figure 7A:
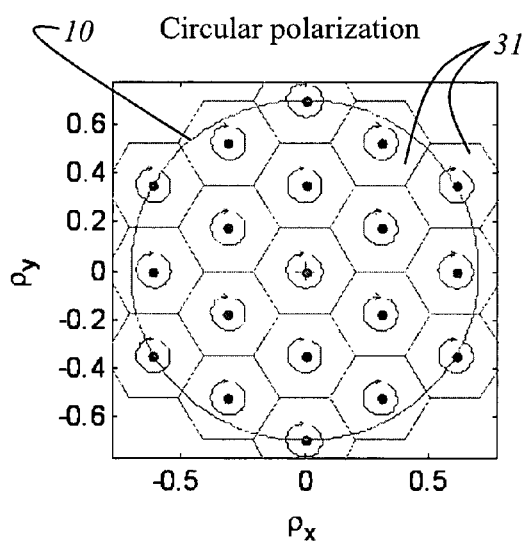
FIG. 7a shows a circular polarization of the illumination pupil, wherein each segment has a circular polarization.
Figure 7B:
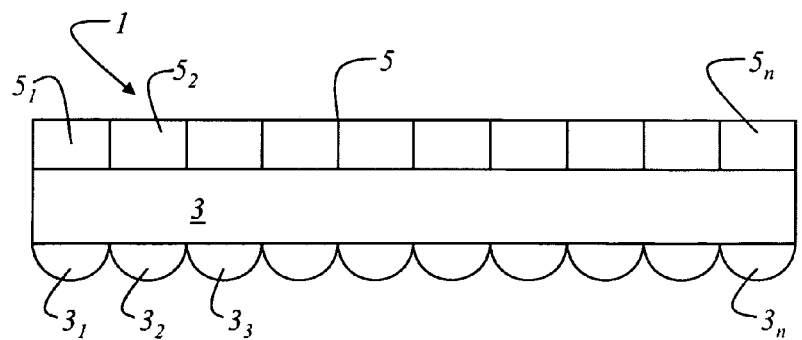
FIG. 7b shows a schematic representation of the element according to a further embodiment of the invention; and, FIG. 8 shows a schematic representation of a circular polarization of the illumination pupil, wherein the segments have a shape differing from that shown in FIG. 7.

FIG. 7a shows a further embodiment of the polarization of the individual segments in the objective pupil of objective 12. In the embodiment shown in FIG. 7a, the illumination is performed by means of element 1 shown in FIG. 7b. As shown in FIG. 1, the element consists of microlens array 3 and filter 5. In the embodiment shown in FIG. 7b, the filter consists of individual elements $5_1$, $5_2$ to $5_n$. Individual segments $5_1$, $5_2$ to $5_n$ of filter 5 are associated with corresponding lenses $3_1$, $3_2$, $3_3$ to $3_n$ of microlens array 3. Each element $5_1$, $5_2$ to $5_n$ of filter 5 may have its own polarization. In the embodiment shown here, the filter is fixedly connected to the microlens array. The individual segments of filter $5_1$, $5_2$ to $5_n$ have a circular polarization. The illumination of pupil 10 of objective 12 thus results in individual segments having a circular polarization. The circular polarization may also be carried out by a circularly polarizing filter without segmentation. The segmentation is mainly interesting for radial and tangential polarization.

Figure 8:
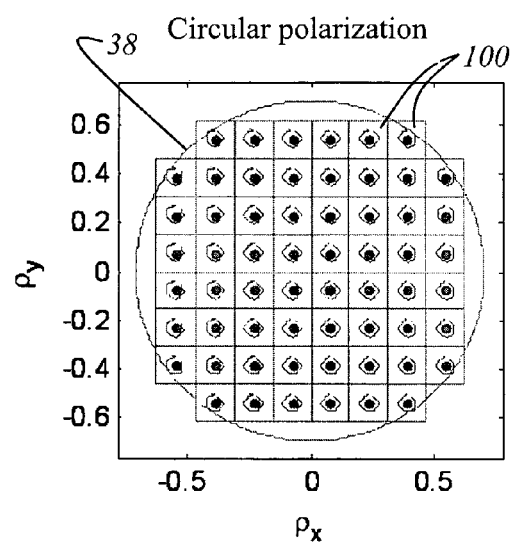

The embodiment shown in FIG. 8 also shows a circular polarization of the individual elements within the pupil of objective 12. Individual segments $5_1$, $5_2$ to $5_n$ of filter 5 have a rectangular or square or hexagonal shape. Generally, the shape depends on the arrangement of the lenses in the microlens array. If the microlens array has a hexagonal structure (see FIG. 7c), the segments in the filter will also be arranged hexagonally. In FIG. 8, the elements of the microlens array are arranged orthogonally. Someone skilled in the art will understand that individual segments $5_1$, $5_2$ to $5_n$ of the filter may have any shape. The only requirement to be met is that the shape of individual segments $5_1$, $5_2$ to $5_n$ of the filter is designed such that filter 5 may be completely covered.

The invention has been described with respect to a particular embodiment. However, someone skilled in the art will understand that modifications and changes may be made to the invention without departing from the scope of the following claims.

What is claimed is:

1. An optical system with homogenized illumination with a set degree of polarization, comprising an element with at least two components, wherein the first component includes a microlens array, and the second component includes a filter for setting the desired polarization, and wherein the element is arranged in an optical axis defined by a light source, the element is aligned along the optical axis so that a light beam from the light source reaches the second component via a condenser before reaching said first component, and imaging optics image an illumination pupil and light coming from the first component with further optics into an objective pupil of an objective, wherein a first degree of polarization in the objective pupil is identical to a second degree of polarization in the illumination pupil.

2. The optical system of claim 1, wherein the filter is a segmented filter for setting the degree of polarization.

3. The optical system of claim 1, wherein the filter has a radial polarization, and wherein the filter is constructed of individual elements.

4. The optical system of claim 1, wherein together with the further optics and the objective, an intermediate image plane is imaged into an objective plane of the objective, so that the intermediate image plane is illuminated homogeneously and the optics and objective are operatively arranged so that the objective plane is also illuminated homogeneously.

* * * * *